(12) United States Patent
Thorne, IV

(10) Patent No.: US 8,006,554 B2
(45) Date of Patent: Aug. 30, 2011

(54) FILTER AND SPE PLATE CLOGGED WELL DETECTION

(75) Inventor: Edward H. Thorne, IV, Shrewsbury, MA (US)

(73) Assignee: Caliper Life Sciences, Inc., Mountain View, CA (US)

( * ) Notice: Subject to any disclaimer, the term of this patent is extended or adjusted under 35 U.S.C. 154(b) by 464 days.

(21) Appl. No.: 12/264,759

(22) Filed: Nov. 4, 2008

(65) Prior Publication Data

US 2009/0151460 A1    Jun. 18, 2009

Related U.S. Application Data

(60) Provisional application No. 61/013,871, filed on Dec. 14, 2007.

(51) Int. Cl.
*G01F 23/28* (2006.01)
(52) U.S. Cl. ............... 73/290 V; 73/662; 73/149
(58) Field of Classification Search .......... 73/662, 73/290 V, 149
See application file for complete search history.

(56) References Cited

U.S. PATENT DOCUMENTS

| | | | |
|---|---|---|---|
| 4,154,795 A | 5/1979 | Thorne | |
| 4,785,664 A * | 11/1988 | Reebs | 73/290 V |
| 4,811,595 A * | 3/1989 | Marciniak et al. | 73/149 |
| 4,821,569 A | 4/1989 | Soltz | |
| 4,991,433 A * | 2/1991 | Warnaka et al. | 73/290 V |
| 5,131,271 A * | 7/1992 | Haynes et al. | 73/290 V |
| RE34,133 E | 11/1992 | Thorne | |
| 5,319,974 A * | 6/1994 | Lenz et al. | 73/290 V |
| 5,465,629 A * | 11/1995 | Waylett, Jr. | 73/864.24 |
| 5,578,270 A | 11/1996 | Reichler et al. | |
| 5,841,028 A * | 11/1998 | Bray et al. | 73/290 V |
| 5,880,364 A * | 3/1999 | Dam | 73/149 |
| 6,915,679 B2 | 7/2005 | Chien et al. | |
| 6,932,097 B2 * | 8/2005 | Ellson et al. | 137/2 |
| 7,046,357 B2 * | 5/2006 | Weinberger et al. | 356/246 |
| 7,454,958 B2 * | 11/2008 | Ellson et al. | 73/61.43 |
| 7,849,738 B2 * | 12/2010 | Larson et al. | 73/290 V |
| 2003/0017085 A1 | 1/2003 | Kereso et al. | |
| 2003/0200801 A1 * | 10/2003 | Lipscomb et al. | 73/290 V |
| 2006/0054455 A1 * | 3/2006 | Kuykendall et al. | 194/217 |
| 2006/0180548 A1 * | 8/2006 | Ji | 210/649 |
| 2007/0012113 A1 * | 1/2007 | Ulmer | 73/618 |

FOREIGN PATENT DOCUMENTS

EP    0801309 A2    10/1997
JP    2006007081    1/2006

* cited by examiner

*Primary Examiner* — Hezron E Williams
*Assistant Examiner* — Rodney T Frank

(57) ABSTRACT

The invention provides a method, a system, and a computer readable medium for determining the fill-ready status of one or more wells of a plurality of wells formed in a filter or solid-phase extraction (SPE) plate. In the method, a signal is directed toward a well of the plurality of wells. A reflected signal is received from the well responsive to the directed signal. The fill-ready status of the well is determined based on the received reflected signal. The steps may be repeated until the fill-ready status of each of the plurality of wells has been determined. In the method and the apparatus, the directed signal may be generated by a piezoelectric crystal. Some of the reflected vibrations impact the piezoelectric crystal, which oscillates in response. The piezoelectric crystal transmits a signal to a processor, the signal corresponding to the height of the liquid or other material in the well.

14 Claims, 6 Drawing Sheets

FILTER AND SPE PLATE CLOGGED WELL DETECTION

CROSS REFERENCE TO RELATED APPLICATIONS

This Application claims priority from U.S. Provisional Application Ser. No. 61/013,871, filed Dec. 14, 2007, incorporated herein in its entirety by reference.

FIELD OF THE INVENTION

This invention relates generally to preparing a sample for analysis using a filter or solid phase extraction (SPE) plate having a plurality of wells. More specifically, the invention relates to methods, systems, and computer-readable media for determining the fill-ready status of wells in a filter or SPE plate, thereby detecting clogged wells.

BACKGROUND OF THE INVENTION

Array trays and assemblies are used in analyzing liquids and solids to determine, for example, their chemical, biochemical, or biological nature (including, for example, DNA/RNA cleanups, PCR setup, protein precipitation, solid phase extraction, protein purification, solubility assays, kinase assays, solid-liquid extraction, protein separation, and cell-based assays). Such arrays include filter plates and solid phase extraction (SPE) plates, which typically contain a plurality of wells in which liquids are forced through a membrane or sorbent located at the bottom of each well using differential pressure across the well.

Conducting assays using these multiwell plates generally requires multiple additions of liquids into the wells in the plates alternating with removal of the liquids. During an assay, non-soluble material in the liquid may cause a blockage (also referred to as a "clog") that prevents the liquid from migrating through the well at the preferred rate over the desired period of time, resulting in a clogged well (also referred to as a "blocked" well). Clogged wells can overflow with the subsequent addition of liquid, causing loss of the samples in the clogged wells as well as contamination of the surrounding wells.

It would, therefore, be desirable to have methods and systems for determining the fill-ready status of each well in a filter or SPE plate in order to detect any clogged well in a filter or SPE plate and protect against sample loss and contamination.

SUMMARY OF THE INVENTION

One aspect of the invention provides a method of determining the fill-ready status of one or more wells of a plurality of wells formed in a filter or solid-phase extraction (SPE) plate. A signal is directed toward a well of the plurality of wells formed in the plate. A reflected signal is received from the well responsive to the directed signal. The fill-ready status of the well is determined based on the received reflected signal. The steps of the method may be repeated to determine the fill-ready status of all of the plurality of wells formed in the filter or SPE plate.

Another aspect of the invention provides a system for determining the fill-ready status of one or more wells of a plurality of wells formed in a filter or solid-phase extraction (SPE) plate. The system comprises means for directing a signal toward a well of the plurality of wells formed in the filter or SPE plate, means for receiving a reflected signal from the well responsive to the directed signal, means for determining whether the well is fill-ready based on the reflected signal, and means for filling the well based on a determination that the well is fill-ready. The system may further comprise means for clearing a well or for notifying a system operator that a well is clogged based on a determination that the well is not fill-ready.

Yet another aspect of the invention is a computer-readable medium containing instructions for controlling a processor performing a method for determining the fill-ready status of one or more wells of a plurality of wells formed in a filter or solid-phase extraction (SPE) plate. The computer-readable medium includes instructions for sequentially directing a signal toward each of the plurality of wells formed in the filter or SPE plate, for receiving a reflected signal from each of the plurality of wells responsive to the directed signal, and for determining whether each of the plurality of wells is fill-ready based on the received reflected signal.

The foregoing and other features and advantages of the invention will become further apparent from the following detailed description of the presently preferred embodiments, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

Throughout the various figures, like reference numbers refer to like elements.

DETAILED DESCRIPTION OF PRESENTLY PREFERRED EMBODIMENTS

Figure 1:
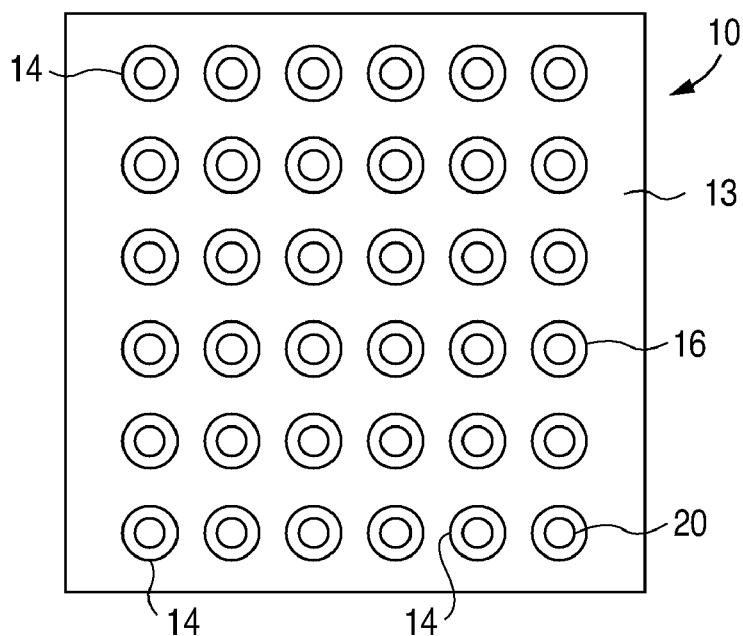
FIG. 1 is a top view of a filter or SPE plate in accordance with one embodiment of the present invention.
Figure 2:
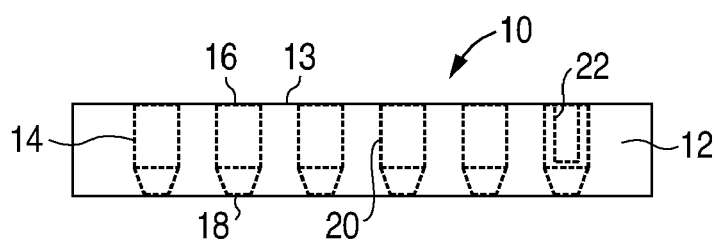
FIG. 2 is a side view of a portion of the plate of FIG. 1.

One aspect of the present invention is a system for determining the fill-ready status of one or more wells of a plurality of wells formed in a filter or solid phase extraction (SPE) plate. FIGS. 1 and 2 are top and side views, respectively, of a filter or SPE plate designated 10. Plate 10 comprises a unitary tray 12 having a number of spaced apart, discrete filter or SPE wells 14 defined therein.

Figure 3:
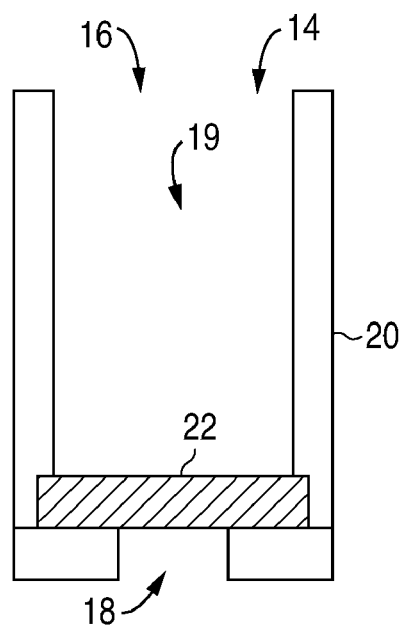
FIG. 3 is an enlarged side view of a well of the plate of FIGS. 1 and 2.

FIG. 3 is a detailed cross-section of a filter or SPE well 14 such as those illustrated in FIGS. 1 and 2. Well 14 has opposing ends: first end or top 16 and second end or bottom 18. Side walls 20 are shown extending between first and second ends 16 and 18 and defining well cavity 19. A porous layer 22 is typically formed at the bottom end 18 of each well 14, as shown in FIG. 3; however, other arrangements are possible. For example, the side walls of the well may be porous as shown in FIG. 2. In a filter plate, porous layer 22 acts as a filter. In a SPE plate, porous layer 22 includes a material bound to the porous layer for solid phase extraction.

In practice, a liquid is loaded, entered, or injected into well 14 through or at first end 16. In filtration applications, the liquid migrates through porous layer 22 as it moves from first end 16 through second end 18, leaving unwanted particulates in or on the filter. In SPE extractions, the liquid may interact with the stationary phase bound to porous layer 22 to extract a desired analyte from the liquid. Any bound analyte is retained by the stationary phase until it is eluted from porous layer 22 using the appropriate reagent.

Figure 4:
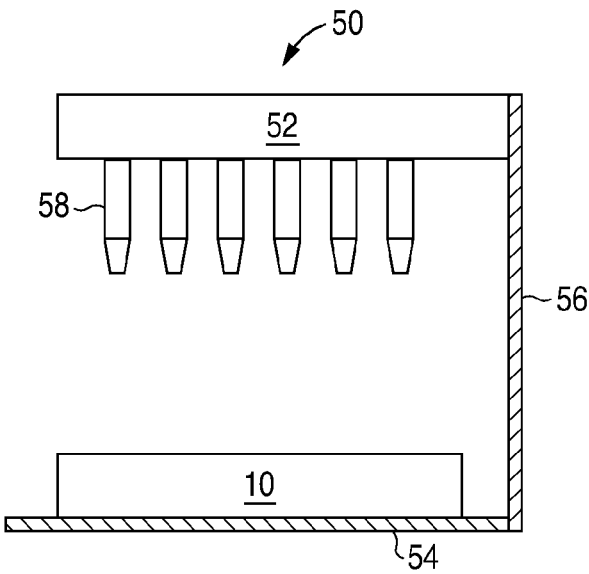
FIG. 4 is a side view of a fill apparatus that may be used with the plate of FIG. 1 in accordance with one embodiment of the present invention.

FIG. 4 depicts one embodiment of an automated liquid handling workstation or fill apparatus 50 that may be used to deliver one or more liquids into the wells of a filter or SPE plate. In the present embodiment, fill apparatus 50 comprises a control unit, head or gripper 52, a deck 54, and a support member 56 adapted to move one or both of head 52 and deck 54 with respect to each other. In addition, fill apparatus 50 includes a plurality of tips or nozzles 58 fluidly communicating with head 52 and adapted to load, enter, or inject liquid into one or more of the filter or SPE wells 14 of plate 10.

In at least one embodiment, fill apparatus 50 includes a vacuum system (not shown). The vacuum system is adapted to create a pressure differential between the first and second ends 16 and 18 of each filter or SPE well 14. The pressure differential causes a liquid to migrate through each well 14, from first end 16 to second end 18. The pressure differential may be produced by applying a positive pressure to first end 16 or a negative pressure to second end 18.

Figure 5:
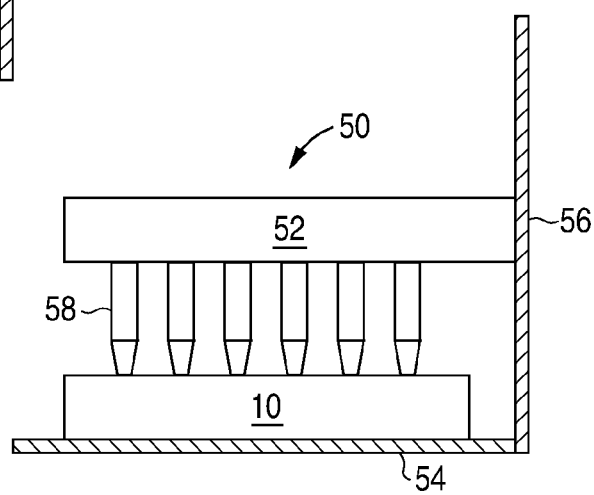
FIG. 5 is a side view of the fill apparatus of FIG. 4, shown filling the plate of FIG. 1 in accordance with one embodiment of the present invention.

FIG. 5 depicts a side elevational view of fill apparatus 50 engaging and filling plate 10. In the depicted embodiment, head 52 is movable with respect to deck 54 and plate 10, enabling fill apparatus 50 to inject liquids into the wells 14 of plate 10 using one or more nozzles 58.

Conducting assays or other procedures using filter or SPE plates typically requires multiple additions of liquids to wells with intervening removal of the liquids from the wells, e.g., by the liquids passing through the porous layer 22. It is not uncommon that non-soluble material in the liquid may prevent a well from being evacuated at the preferred rate over a specific period of time. This results in a clogged well that can overflow with the subsequent addition of liquid, causing cross-contamination with the surrounding wells and a subsequent loss of not only the sample in the clogged well, but also contaminated samples in the surrounding wells.

Figure 6:
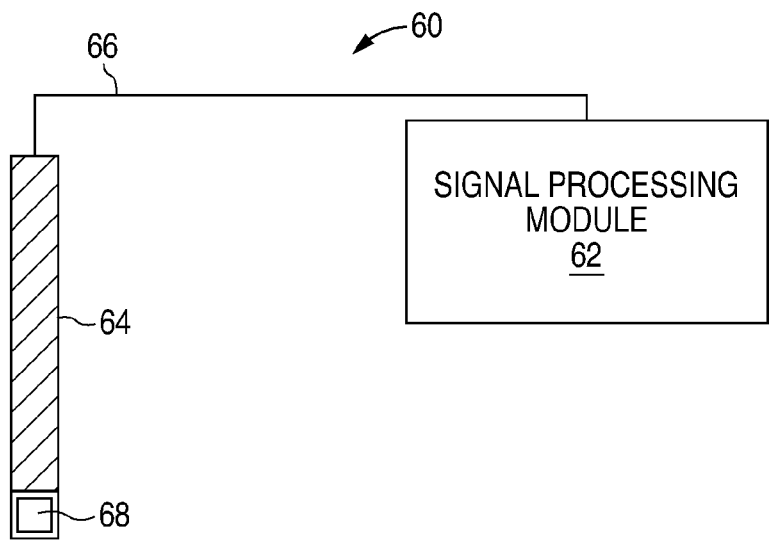
FIG. 6 is a block diagram of a sensing apparatus in accordance with one embodiment of the present invention.

FIG. 6 is a block diagram of a sensing apparatus 60 adapted to determine whether the wells in a filter or SPE plate are not clogged and, therefore, fill-ready. Sensing apparatus 60 includes a signal processing module 62 (e.g., a processor or computer) coupled to and communicating with at least one transducer 64 via coupling or transmitting wire 66. In the illustrated embodiment, transducer 64 includes at least one piezoelectric crystal 68 adapted to generate vibrations that serve as signals for determining the fill-ready status of the wells (i.e., for indicating whether the well is or is not clogged).

In general, sensing apparatus 60 is used to scan the nearest surface, where the nearest surface may be the second end or bottom 18 of an empty well 14, the top surface of a liquid or other material in a well 14, or the top surface 13 of tray 12. Sensing apparatus 60 may scan in either a continuous or intermittent motion.

Signal processing module 62 includes a computer-readable medium containing instructions for directing one or more signals (sonic or ultrasonic) at filter or SPE wells 14 formed in plate 10.

In at least one embodiment, signal processing module 62 produces or generates a brief series or plurality of high-voltage pulses. The pulses are communicated or transmitted to the piezoelectric crystal 68 via transmitting wire 66. These pulses cause the piezoelectric crystal 68 to oscillate at its fundamental frequency. Such piezoelectric crystal oscillation causes or creates vibrations that travel through the surrounding media (air or cover gas, for example) at a constant velocity for a given set of environmental conditions. The physical shape of piezoelectric crystal 68, its orientation, its fundamental frequency, and the overall physical properties of transducer 64 are optimized to focus the vibrational energy of piezoelectric crystal 68 toward the desired areas of plate 10.

The signal transmitted from piezoelectric crystal 68 reduces in amplitude as it travels to and from the reflecting surface. It is therefore advantageous to increase the gain of piezoelectric crystal 68 over time in order to easily measure such lower amplitude signals.

Piezoelectric crystal 68 stops oscillating shortly after the high-voltage pulses end or are terminated. The vibrations, however, continue to travel outward from piezoelectric crystal 68 and are reflected back from the nearest surface, forming reflected signals. Some of the reflected vibrations impact piezoelectric crystal 68, causing the piezoelectric crystal to oscillate. The oscillating piezoelectric crystal transmits a corresponding signal via transmitting wire 66 to module 62, where the signal is processed.

The vibrations are directed at, and reflected back from, the second end or bottom 18 of an empty filter or SPE well 14, the top surface of a liquid or other material in a filled well 14, and/or the top surface 13 of tray 12 of filter or SPE plate 10. Signal processing module 62 is adapted to determine the distance from the piezoelectric crystal to the encountered surface by measuring the signal transmission and return time and computing the distance based on the known velocity of the signal vibrations through the media.

The fill-ready status of a well may be determined solely on the basis of the computed distance from the piezoelectric crystal to the top surface of the liquid or other material in such well. Alternatively, because changes in humidity and temperature can cause slight variations in the velocity of the outgoing and reflected vibrations, accuracy of the determination may be improved by also computing the distance from the piezoelectric crystal to the top surface of the tray 12 and/or the bottom 18 of an empty well 14. Signal processing module 62 may store this information as a standard measure or, alternatively, determine this distance at the beginning of each application. Signal processing module 62 may then determine the position of the surface of the liquid or other material in a well relative to the top surface of the plate or tray and/or the bottom of an empty well, thereby determining if one or more wells are clogged.

Signals transmitted from the piezoelectric crystal generally diverge as they travel away from the system. Reflected signals from objects located directly in front of the sensing apparatus are generally of higher amplitude than signals reflected from objects not located directly in front of the sensing apparatus. This may make it difficult to determine the distance to the bottom of a well because a weak signal may reflect peripherally from the top of the tray and be falsely interpreted as the level of liquid or other material in the well. One approach to eliminating this effect is to reduce the gain of the sensing apparatus until the signal has traveled past the top of the tray and to also establish an amplitude threshold below which signals will be ignored. This approach allows the weaker peripheral reflections from the top of the tray to be ignored when the sensing apparatus is located approximately above the center of a well while still allowing the distance to the surface of liquids or other materials in a well to be accurately determined.

Another approach is to ignore all reflected signals from objects that are as close as or closer than the top of the tray. The disadvantage of this second approach is that signals reflected from a liquid or other material in a well that is even with or above the top of the tray will be ignored.

Plate 10 is scanned in a continuous or intermittent motion. During such scanning operations, the plate may be moved with respect to one or more fixed sensing apparatuses, or the sensing apparatus(es) may be moved with respect to a fixed plate, or both the sensing apparatus(es) and the plate may be simultaneously moved so that multiple wells within the plate are ultimately scanned. In one example in which the wells of the plate are arranged in rows, the signal is directed toward each of the wells in a row in sequence, thereby scanning the row of wells. The row of wells may be scanned across and back in a continuous motion. Scanning steps may be repeated until the fill-ready status of each of the wells in a plate has been determined.

It is contemplated that signal processing module 62 is further adapted to map and store the positions of plate 10 and the filter or SPE wells 14 therein, thereby providing a mapped grid. The processing module generates and receives signals as provided previously. The signal processing module 62, using the received reflected signals as provided previously, stores the positions of the plate 10 and each well 14 in the plate.

In the event that signal processing module 62 determines that a well is not fill-ready (i.e., clogged) based on the distance from the piezoelectric crystal to the top surface of the liquid or other material in the well, the signal processing module may facilitate readying the clogged well by clearing the blockage using the vacuum, for example. In another embodiment, the signal processing module may facilitate filling only those wells determined to be fill-ready (i.e., not clogged), using the stored positions of the wells, for example. In still another embodiment, the signal processing module may notify the operator that one or more of the wells are not fill-ready by generating a signal or alarm, allowing the operator to clear the blockage(s). If signal processing module 62 has mapped the wells, it may indicate the wells that need to be cleared by showing the location of any clogged well(s) on the mapped grid using lights or a display (not shown). In still another embodiment, the processing module may facilitate another mechanical operation that will clear the blockage, for example piercing the clogged well(s) with a sharpened object.

Figure 7:
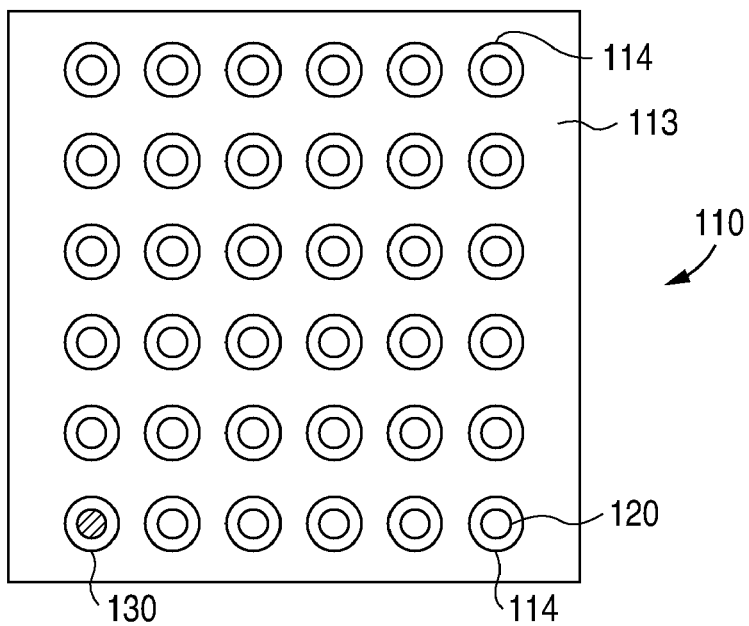
FIG. 7 is a top view of a filter or SPE plate similar to that shown in FIG. 1, depicting a blockage in one of the plurality of wells, resulting in a clogged well.
Figure 8:
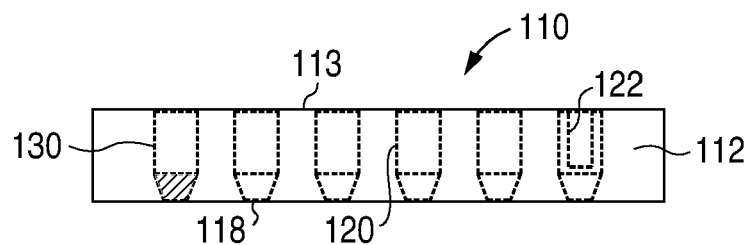
FIG. 8 is a side view of a portion of the filter or SPE plate and the clogged well of FIG. 7.

Referring now to FIGS. 7 and 8, top and side views of filter or SPE plate 110 are depicted having a plurality of filter or SPE wells 114 similar to those provided previously with respect to FIGS. 1 and 2. As illustrated, one of the wells, shown at 130 in FIGS. 7 and 8, is clogged. The addition of liquid to clogged well 130, without some intervention, will result in an overflow, causing contamination of the surrounding wells and loss of the affected samples.

Figure 9:
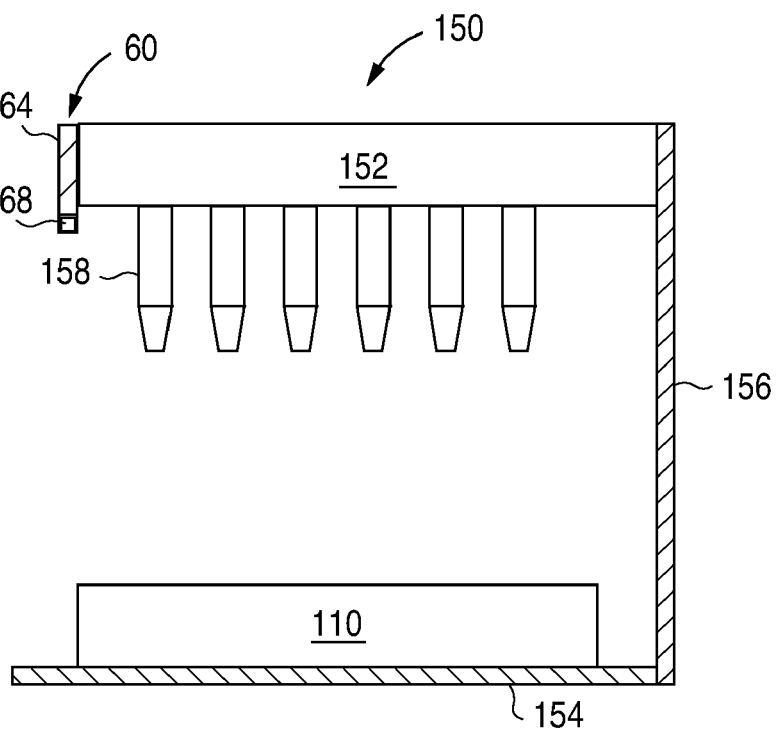
FIG. 9 is a side view of a fill apparatus having the sensing apparatus of FIG. 6 used with the filter or SPE plate of FIG. 7 in accordance with one embodiment of the present invention.
Figure 10:
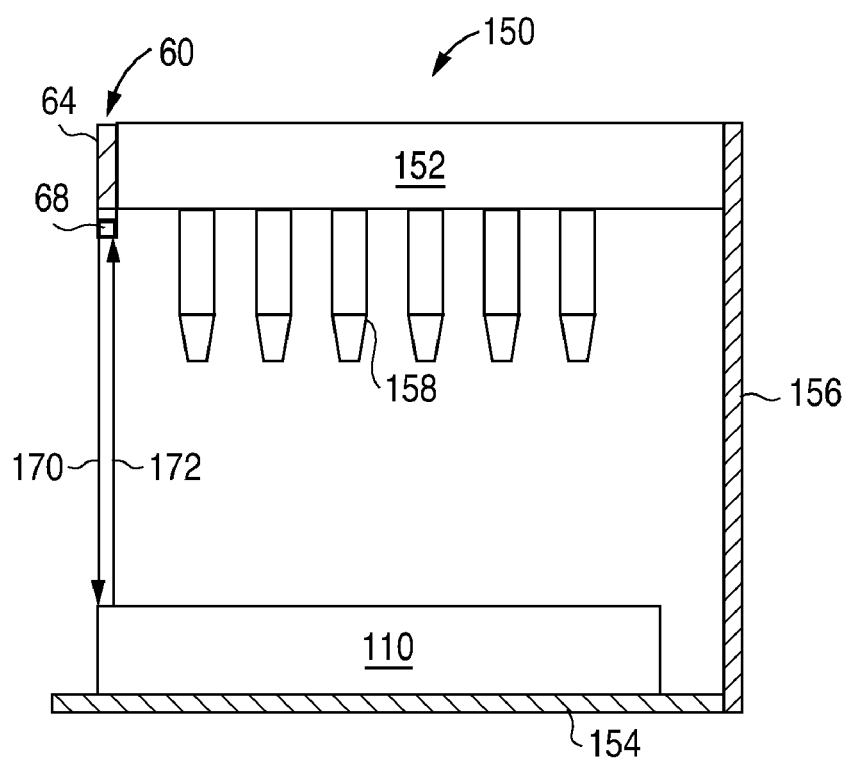
FIG. 10 is a side view of the fill apparatus of FIG. 9, illustrating the directed and reflected signal.
Figure 11:
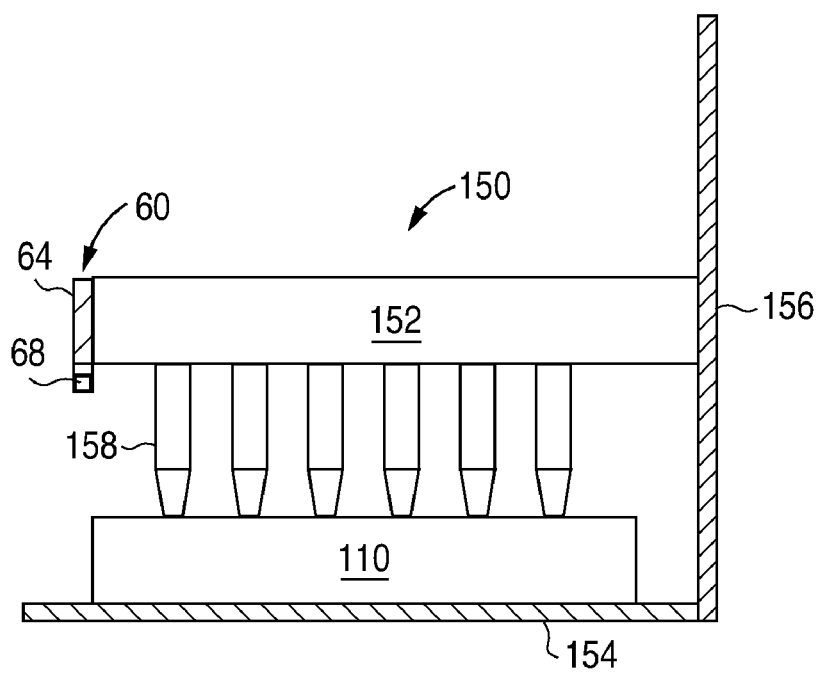
FIG. 11 is a side view of the fill apparatus of FIG. 9 filling the filter or SPE plate of FIG. 7 in accordance with one embodiment of the present invention.

FIGS. 9, 10, and 11 depict side views of a fill apparatus 150 that is similar to the fill apparatus shown in FIGS. 4 and 5 at 50. Fill apparatus 150 includes a sensing apparatus 60 such as that shown in FIG. 6. Fill apparatus 150 further comprises head 152 having a plurality of nozzles 158, deck 154, and support member 156 adapted to move head 152 and deck 154 with respect to each other.

Fill apparatus 150 includes a sensing apparatus 60 adapted to determine whether the wells in a filter or SPE plate are fill-ready in accordance with one embodiment of the present invention as provided previously. In the illustrated embodiment, sensing apparatus 60 of fill apparatus 150 comprises a signal processing module 62 (as seen in FIG. 6) coupled to and communicating with at least one transducer 64 via coupling or transmitting wire 66 (as seen in FIG. 6). Transducer 64 of fill apparatus 150 includes at least one piezoelectric crystal 68 adapted to generate vibrations. In one embodiment, signal processing module 62 is incorporated into head 152. Signal processor 62 may, alternatively, be a separate unit.

Sensing apparatus 60 is used to scan the nearest surface, where the nearest surface is the second end or bottom 118 of an empty well 114, the top surface of a liquid or other material in a properly filled or clogged well, or the top surface 113 of tray 112 (as seen in FIGS. 7 and 8). Signal processing module 62 produces or generates a brief series or plurality of high-voltage pulses. These pulses cause piezoelectric crystal 68 to oscillate at its fundamental frequency.

As previously described, piezoelectric crystal 68 stops oscillating shortly after the high-voltage pulses end or are terminated. The vibrations continue to travel through the media. As seen in FIG. 10, vibrations 170 travel outward from piezoelectric crystal 68 and are reflected back by the encountered object(s), forming reflected vibrations 172. The reflected vibration signals cause piezoelectric crystal 68 to oscillate. The oscillating piezoelectric crystal 68 transmits a corresponding signal to processing module 62, where the signal is processed.

Signal processing module 62 is adapted to receive the signals reflected from wells 114 and determine whether one or more of the plurality of wells 114 are fill-ready based on such reflected signals. In at least one embodiment, plate 110 is placed or positioned on deck 154. One or more signals are generated, and the reflected signals are received. The processing module is adapted to determine or measure the distance from the piezoelectric crystal to the top surface 113 of tray 112, to the bottoms of wells 114, and/or to the nearest surface of the liquid or other material within a well by measuring the signal transmission and return time and computing the distance based on the known velocity of the signal vibrations through the air or other gaseous medium.

Signal processing module 62 is adapted to determine if one or more of the wells are clogged (e.g., clogged well 130) based upon such measurements. For example, signal processing module 62 may determine the position of the surface of the liquid or other material in a well relative to the top surface of the plate or tray and/or the bottom of the well, thereby determining if one or more wells are clogged.

In the event that signal processing module 62 determines one or more of the wells are clogged (i.e., not fill-ready), signal processing module 62 may provide instructions to ready the clogged well(s) by clearing the blockage by, for example, using the vacuum. In another embodiment, signal processing module 62 may provide instructions to fill only those wells 114 determined to be not clogged (i.e., fill-ready), using the stored positions of the wells, for example. In still another embodiment, signal processing module 62 may notify the operator that one or more of the wells are not fill-ready by generating a signal or alarm, allowing the operator to clear the blockage. If signal processing module 62 has mapped the wells, it may indicate the wells that need to be cleared by showing the position of each clogged well using lights or a display (not shown). In still another embodiment, the processing module may facilitate another mechanical operation that will clear the blockage, for example by piercing the clogged well or wells with a sharpened object.

Figure 12:
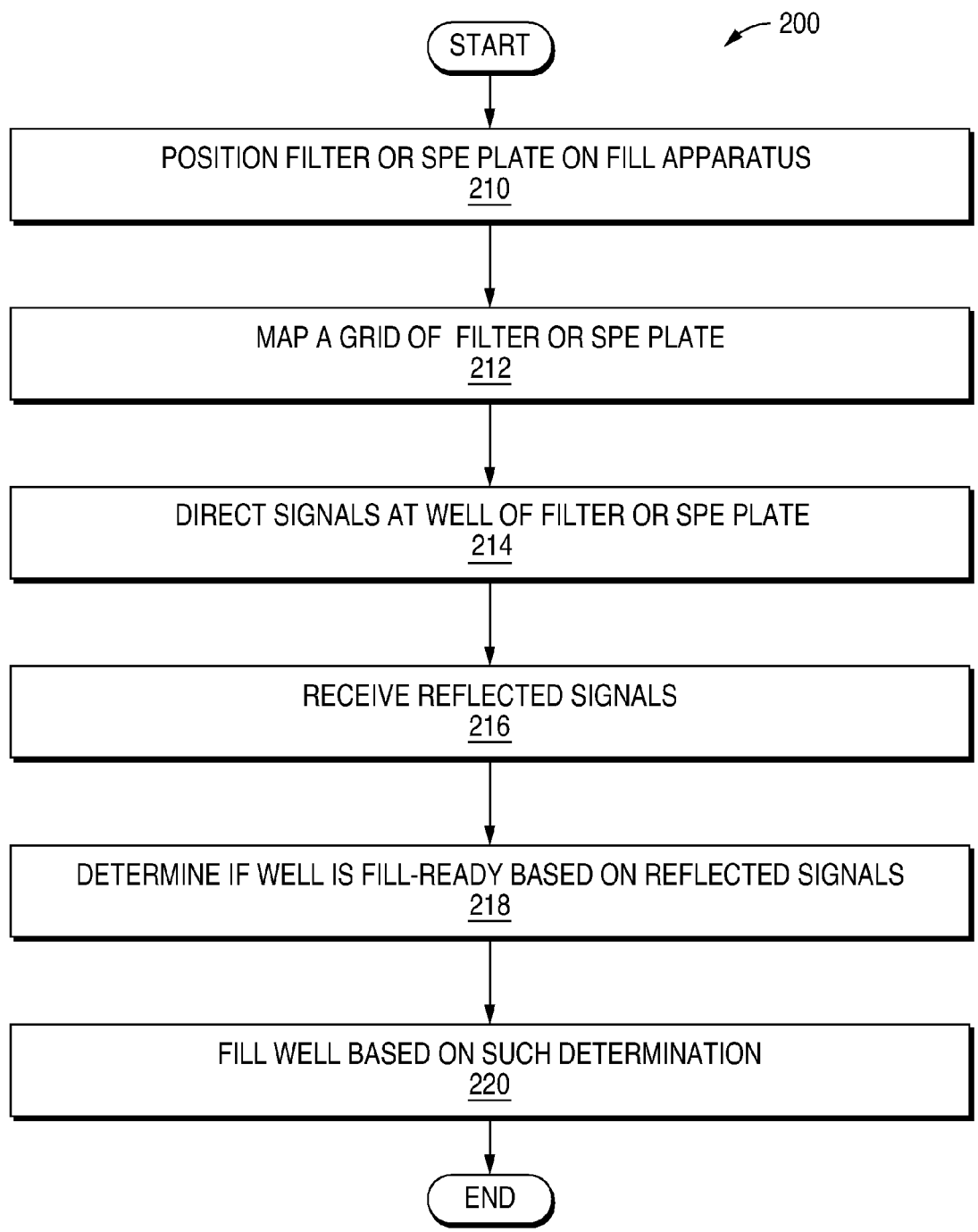
FIG. 12 is a flow diagram illustrating one method of analyzing a sample using a filter or SPE plate in accordance with one embodiment of the present invention.

Another aspect of the present invention is a method of detecting a clogged well in a filter or SPE plate. FIG. 12 depicts a flow diagram, generally designated 200, illustrating one method of using a filter or SPE plate in accordance with one embodiment. Method 200 comprises positioning a filter or SPE plate on a fill apparatus (Block 210) and mapping a grid of the plate (Block 212) by recording the position of each well with respect to the other wells formed in the filter or SPE plate. One or more signals (sonic or ultrasonic) are directed at one or more filter or SPE wells formed in the plate (Block 214).

The signals are reflected from at least one of the wells and received (Block 316). The fill-ready status of the well is determined based on the received reflected signals (Block 218). Method 200 further comprises filling at least one of the wells in the plate based on the determination (Block 220).

In one embodiment, the processing module fills only those wells that are not clogged. In another embodiment, the fill apparatus unclogs any clogged well using a vacuum (not shown) or other device. In yet another embodiment, the fill apparatus operator is notified of the clogged well(s).

Figure 13:
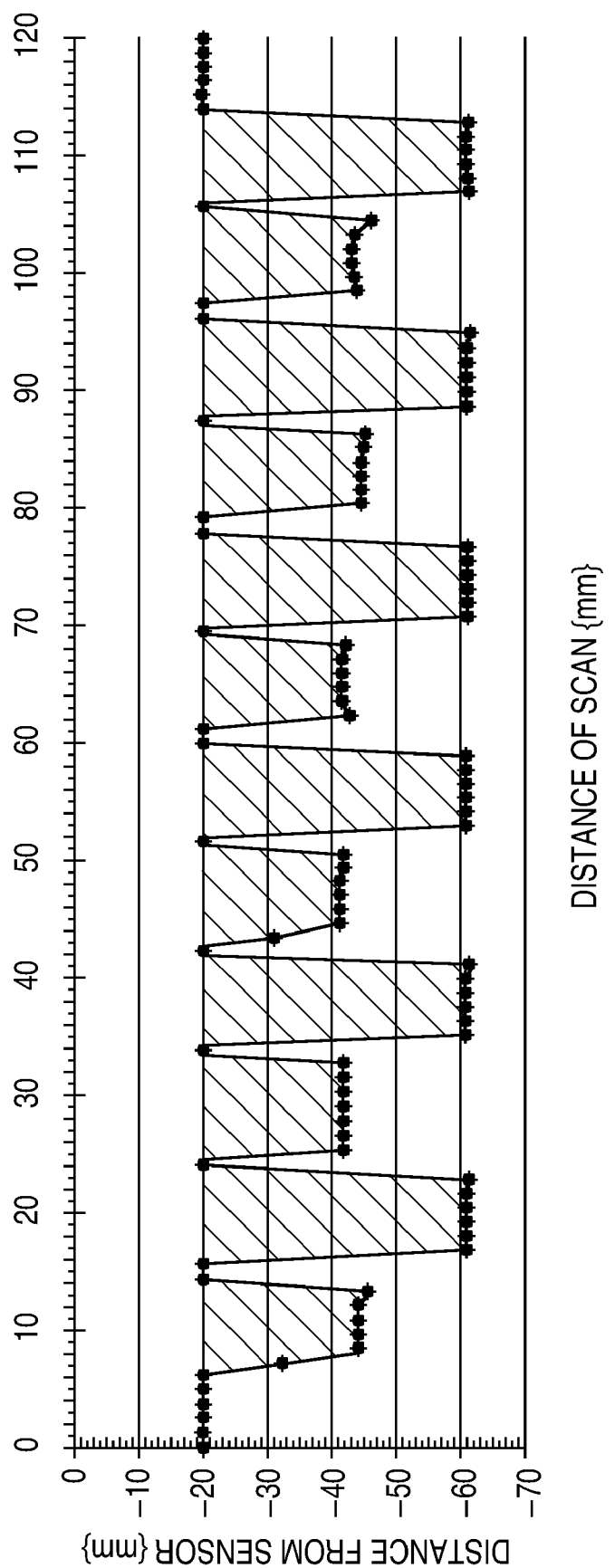
FIG. 13 depicts a profile of a scanned filter or SPE plate generated in accordance with one embodiment of the present invention.

FIG. 13 depicts a scanned profile of a single row of wells generated in accordance with one embodiment of the present invention. FIG. 13 uses shading to indicate levels of liquid (or other material) present in the wells. In the illustrated example, every other well contains some finite volume of liquid, while the remaining wells are empty. The face of the sensing apparatus is positioned at position 0 mm in the illustration. The top surface of the plate or tray measures about 20 mm from the face of the sensing apparatus, as may be seen on the left portion of the illustration. In this illustration, the well separators appear at approximately 20 mm, and these separators clearly differentiate each well. Each data point shown in this illustration represents the processed data for one transmitted and received signal as the sensing apparatus was moved with respect to the fixed location of the plate. Alternatively, the plate could be moved with respect to the fixed position of the sensing apparatus or both the sensing apparatus and plate could be simultaneously moved with respect to each other.

Still another aspect of the present invention is a computer readable medium containing instructions for controlling a processor performing a method of forming a sample for analysis. As previously noted, signal processing module 62 may include such a computer-readable medium. The computer-readable medium contains instructions for carrying out some or all of the steps outlined above and in flow diagram 200 of FIG. 12.

EXAMPLE

The following example serves to illustrate, but not to limit, the present invention. In the present example, a sensing apparatus is mounted into or otherwise attached to the head or gripper of a liquid handling workstation, e.g., a Zephyr® or Sciclone Liquid Handling Workstation, available from Caliper Life Sciences, Inc. The sensing apparatus includes a signal processing module coupled to and communicating with a transducer via a transmitting wire. The signal processing module generates a series of high-voltage pulses that are transmitted to the piezoelectric crystal via the transmitting wire. In this example, a series of pulses is generated at intervals of about 2 milliseconds. The pulses cause the piezoelectric crystal to oscillate at its fundamental frequency, in this example about 800 kHz.

The sensing apparatus scans a filter or SPE plate placed onto the deck of the liquid handling workstation, sending out vibrations from the piezoelectric crystal that are reflected back from encountered surfaces of the filter or SPE plate, e.g., from the tray of the plate as well as from the wells of the plate. In the present example, the plate is a 96-well plate having a standard 8×12 configuration.

The sensing apparatus continuously scans a row of the plate, scanning across the row more than once if necessary, until vibrations reflected back from the tray and wells of that row indicate all of the wells have emptied properly (i.e., are not clogged) or, where wells are clogged (also referred to as "blocked"), for a specified period of time, e.g., 30 seconds, after which the scan of that row times out. The sensing apparatus then goes on to scan all of the rows in the plate until either all of the wells in each row have emptied (are fill-ready) or the time-out period has expired for that row.

The sensing apparatus maps and stores the positions of the filter or SPE plate and the wells therein. Using a grid obtained from mapping the plate, the sensing apparatus indicates any wells that need to be cleared by showing the location of the clogged well(s) on the mapped grid using a display of the grid. The liquid handling workstation is configured either to continue processing of only those wells that have drained properly or to pause so that the workstation operator can clear the clogged wells and signal the workstation to continue processing of all of the wells.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of determining the fill-ready status of one or more wells of a plurality of wells formed in a filter or solid-phase extraction (SPE) plate, the method comprising:
   (i) directing an acoustic signal toward a well of the plurality of wells formed in the filter or SPE plate, wherein the directed signal is generated with at least one piezoelectric crystal;
   (ii) reducing a receiving gain of the piezoelectric crystal until the directed signal has traveled past the top of a tray portion of the filter or SPE plate;
   (iii) receiving a reflected signal from the well responsive to the directed signal; and
   (iv) determining whether the well is fill-ready based on the received reflected signal.

2. The method of claim 1 further comprising filling the well based on the determination whether the well is fill-ready.

3. The method of claim 1 wherein said determining comprises recording a position of the well with respect to the other of the plurality of wells formed in the filter or SPE plate.

4. The method of claim 1 further comprising determining the well is clogged based on the received reflected signal.

5. The method of claim 4 further comprising clearing a blockage from the well.

6. The method of claim 1 wherein said determining comprises measuring a distance from the piezoelectric crystal to the surface of a liquid or other material disposed in the well.

7. The method of claim 1 further comprising increasing the gain of the piezoelectric crystal over time after the directed signal has traveled past the top surface of the tray portion of the plate.

8. The method of claim 1 further comprising ignoring the reflected signal from an object that is as close as or closer than the top of a tray portion of the plate.

9. The method of claim 1 wherein the wells are arranged in a plurality of rows, and wherein the signal is directed toward each of the plurality of wells in a row in sequence, thereby scanning the row of wells.

10. The method of claim 9 wherein the row of wells is scanned until either all of the wells in the row are determined to be fill-ready or a preset time-out period has expired.

11. The method of claim 10 wherein the row of wells is scanned across and back in a continuous motion.

12. A computer-readable medium containing instructions for controlling a processor performing a method for determining the fill-ready status of one or more wells of a plurality of wells formed in a filter or solid-phase extraction (SPE) plate, the medium comprising:
   instructions for sequentially directing an acoustic signal toward each of the plurality of wells formed in the filter or SPE plate, wherein the directed signal is generated with at least one piezoelectric crystal;
   instructions for reducing a receiving gain of the piezoelectric crystal until the directed signal has traveled past the top of a tray portion of the filter or SPE plate;
   instructions for receiving a reflected signal from each of the plurality of wells responsive to the directed signal; and
   instructions for determining whether each of the plurality of wells is fill-ready based on the received reflected signal.

13. The computer-readable medium of claim 12 further comprising instructions for filling a well of the plurality of wells based on a determination that the well is fill-ready.

14. The computer-readable medium of claim 12 further comprising instructions for mapping a grid of the filter or SPE plate.

* * * * *